United States Patent [19]
von Pieverling et al.

[11] 4,095,047
[45] June 13, 1978

[54] PHASE REGULATING CIRCUIT

[75] Inventors: Klaus von Pieverling, Wolfratshausen; Hermann Sepp, Munich; Walter Baier, Kaiserslautern, all of Germany

[73] Assignee: Siemens Aktiengesellschaft, Berlin & Munich, Germany

[21] Appl. No.: 737,534

[22] Filed: Nov. 1, 1976

[30] Foreign Application Priority Data

Nov. 7, 1975 Germany ............................ 2549955

[51] Int. Cl.² .............................................. H04L 7/04
[52] U.S. Cl. ................................................. 178/69.1
[58] Field of Search ..................... 178/58, 69.1; 179/15 BS; 325/58, 321, 418–422; 328/63, 155; 331/14, 78

[56] References Cited

U.S. PATENT DOCUMENTS

| | | | |
|---|---|---|---|
| 3,297,964 | 1/1967 | Hamilton | 331/14 |
| 3,854,011 | 12/1974 | Mallory et al. | 179/15 BS |
| 3,899,746 | 8/1975 | Gammel | 331/14 |
| 3,947,634 | 3/1976 | Betts | 178/69.1 |

*Primary Examiner*—Benedict V. Safourek
*Attorney, Agent, or Firm*—Hill, Gross, Simpson, Van Santen, Steadman, Chiara & Simpson

[57] ABSTRACT

A phase regulating circuit operating in accordance with the delay lock loop principle DLL for synchronizing the phase of a pseudo-random generator at the receiving end which is controlled by a pulse train oscillator and having two identical signal channels and wherein the inputs to the signal channels from the pseudo-random generator is rapidly switched between the two input mixers and wherein the output of the mixing networks is rapidly switched to a difference forming device so as to provide an output for the frequency control circuit of the pseudo-random generator.

8 Claims, 6 Drawing Figures

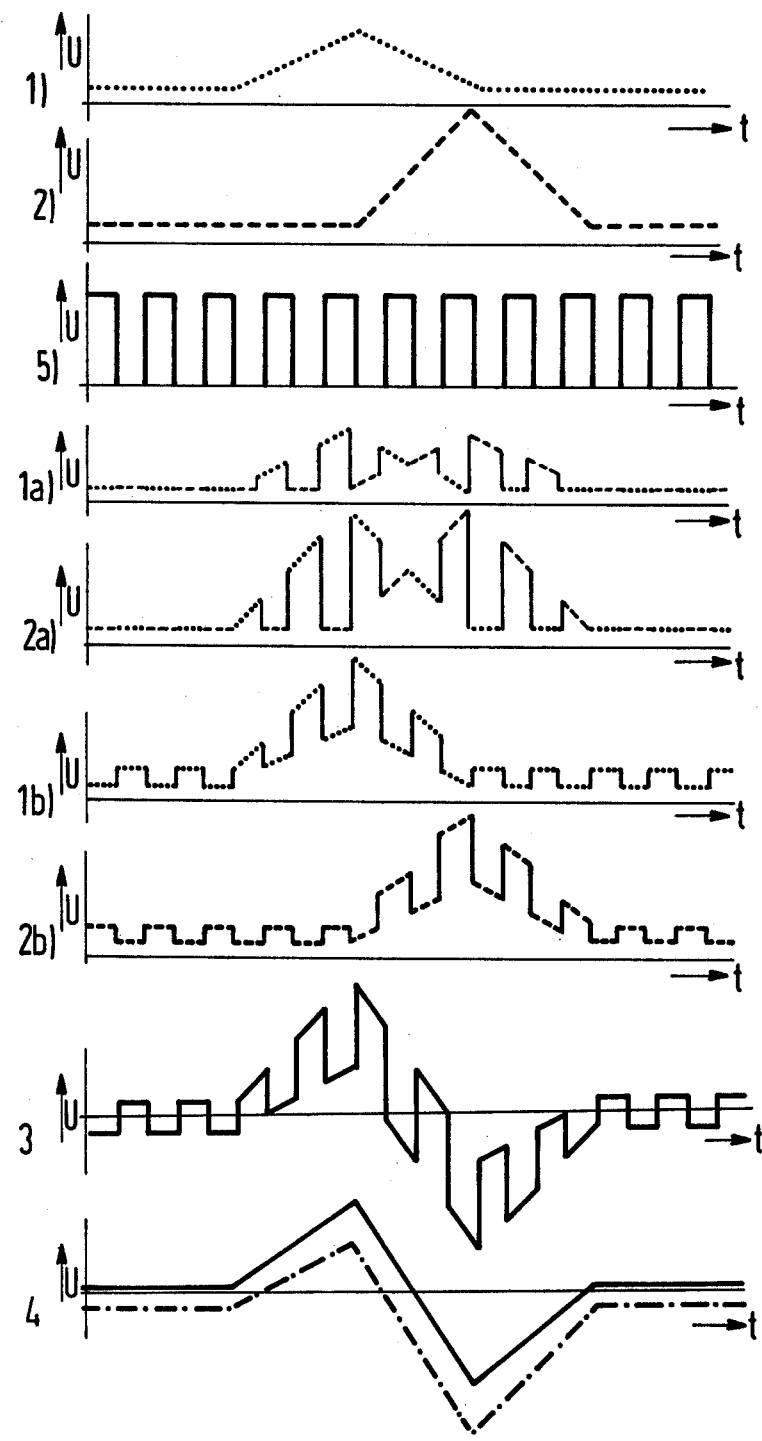

PHASE REGULATING CIRCUIT

BACKGROUND OF THE INVENTION

1. Field of the Invention

This invention relates in general to phase regulating circuits of the delayed lock loop type.

2. Description of the Prior Art

Phase follow-up regulating circuits operating according to the delayed lock loop principle DLL for phase coherent synchronization of the pulse sequence of a receiving pseudo-random generator which is controlled by a pulse train oscillator by the incoming pulse sequence are known. The incoming pulse sequence might be modulated on a carrier frequency of an identical pseudo-random generator at the transmitting end and two identical signal channels are provided each of which includes a mixer which also receives the output of the pseudo-random generator and each of which includes a following network. The outputs of the network are supplied to a difference forming device and each of the inputs receive the incoming signal and the output of the difference forming device is supplied through a loop filter and controls a pulse train oscillator which supplies an output to the pseudo-random generator.

Phase follow-up regulating circuits of this type are required particularly at the receiving end of information transmission systems particularly where for coding or for reducing the interference or for multiple access SSMA pseudo-random generators at the transmitting and receiving ends are used. In such systems, to restore the transmitted data requires that a phase coherent synchronization occur at the receiver so that the pseudo-random generator is synchronized with the pseudo-random generator at the transmitting end to allow demodulation of the intelligence. The phase follow-up regulating circuits are the basic element of an auto-correlation receiver in which the incoming pulse sequence is compared with the output of the pseudo-random generator at the receiver and the phase coherence of the two pulse sequences is identified by a d.c. voltage occurring at the output.

For regulating purposes, it is effective and desirable that the output signal should be of a form which passes through zero linearly in the region of the synchronization point. Systems such as disclosed in the article "IEEE Transactions on Space Electronics and Telemetry" 1963, pages 1 to 8 are known. However, in the systems of the prior art, the two separate channels of the receiver generally are non-linear having different gains which causes the zero point to shift due to the asymmetry of the two channels.

SUMMARY OF THE INVENTION

The present invention provides a regulating system which corrects for asymmetry in the two channels of the discriminator curve and which prevents the loss in signal to noise ratio of 3 dB which occurs in compensating devices of the prior art.

Thus, the invention relates to an improved phase follow-up regulating system for an auto-correlation receiver.

Other objects, features and advantages of the invention will be readily apparent from the following description of certain preferred embodiments thereof taken in conjunction with the accompanying drawing although variations and modifications may be effected without departing from the spirit and scope of the novel concepts of the disclosure, and in which:

BRIEF DESCRIPTION OF THE DRAWINGS

FIG. 6 illustrates voltage diagrams occurring at various points in the circuit illustrated in FIG. 4.

DESCRIPTION OF THE PREFERRED EMBODIMENTS

Figure 1:
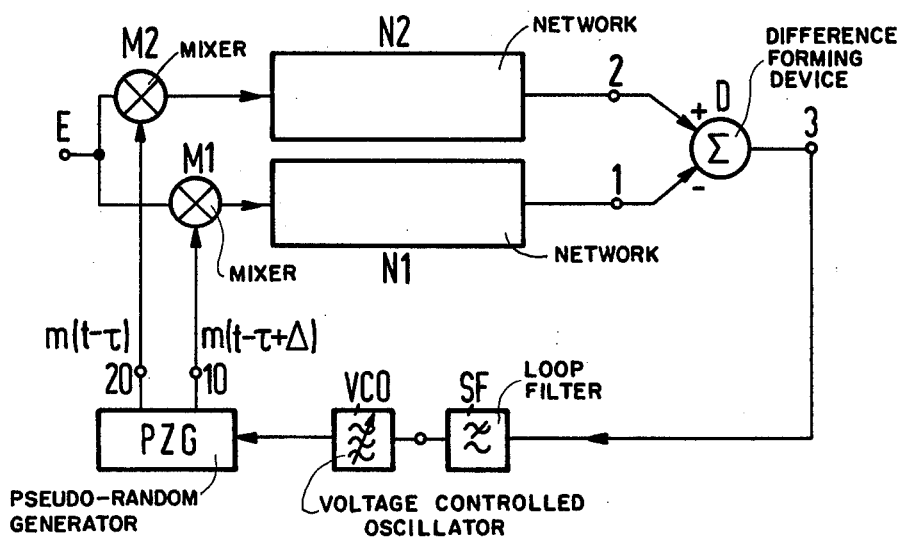
FIG. 1 illustrates a phase follow-up regulating system of the prior art.

FIG. 1 illustrates a phase follow-up regulating system of the prior art such as discussed in the publication "IEEE Transactions on Space Electronics and Telemetry" 1963 at pages 1 to 8. The phase follow-up regulating circuit operates according to the DLL principle and consists of two channels each of which consist of series connection of mixers M1 and M2 and networks N1 and N2. The two channels are connected in parallel at the input side and receive the input E and the output of both of the networks are connected to a difference forming device D. Each of the mixers M1 and M2 receive input pulse sequences from the pseudo-random generator PZG through separate input lines from terminals 10 and 20. The pulse train sequence $m(t - \tau)$ supplied at the second input of the mixer M1 and the pulse train sequence $m(t - \tau + \Delta)$ supplied at the second input of the mixer M1 are displaced in phase from each other by $\Delta$. The pseudo-random generator PZG is controlled by voltage controlled pulse train oscillator VCO. The regulating loop is closed by way of the loop filter SF which receives the output of the difference forming device D and supplies the control input to the pulse train oscillator VCO.

At the synchronized condition, the pulse sequences of the pseudo-random generator PZG appearing at terminals 10 and 20 which are supplied as inputs to the mixers M1 and M2 respectively lead and lag the incoming identical pulse sequence by the time interval of $\Delta/2$.

Figure 2:
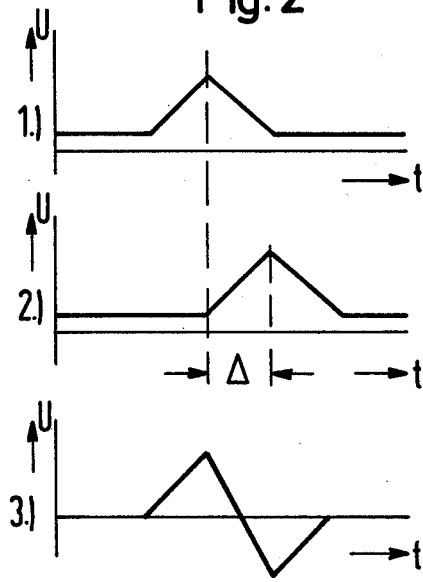
FIGS. 2 and 3 are curves used for explaining the prior art system of FIG. 1.

FIG. 2 illustrates the voltages as a function of time occurring at points 1, 2 and 3 shown in FIG. 1 for the situation in which the shift parameter $\tau$ changes with time $t$. In other words, the incoming pulse sequence has a slight drift in relation to the pulse sequence occurring at the outputs 10 and 20 of the pseudo-random generator PZG. As can be seen from curves (1) and (2) of FIG. 2, the voltage rise indicating phase synchronization at the output of the network N1 occurs before the voltage rise at the output 2 of the network N2. The mutual phase shift is to be such that as can be seen from the voltage curve U of FIG. 2 (3) the discriminator curve passes through zero and is symmetrical to zero at the output of the difference forming device D. The phase of the pulse sequence appearing at the outputs 10 and 20 of the pseudo-random generator PZG is regulated by this discriminator curve by way of the pulse train oscillator VCO which is controllable in frequency such that the voltage U at the output of the difference forming device D moves towards zero.

If heavy demands are made on the regulation accuracy of a phase follow-up regulating circuit of this type, it is necessary that the two channels which each consist of the mixers M1 and M2 and the networks N1 and N2 must possess identical properties. In particular, each of the channels must have equal amplification and an equal offset voltage.

Figure 3:
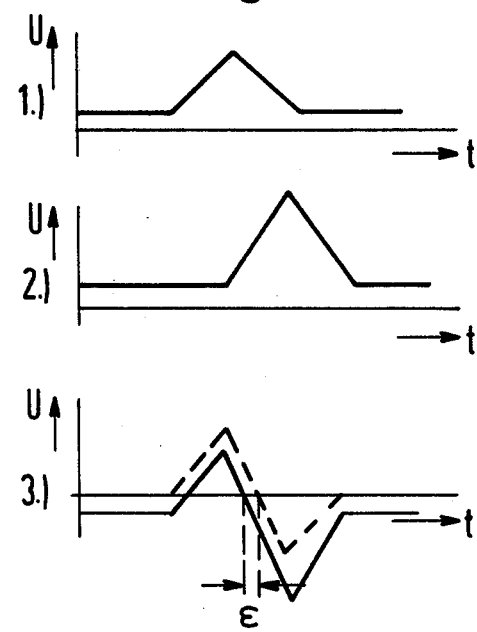

FIG. 3 illustrates the manner in which inequality in the two channels affects the position of the zero crossing point of the discriminator curve and thus the accuracy of the regulation. In FIG. 3, the uppermost voltage curve (1) is identical to the corresponding curve in FIG. 1. The voltage curve (2) of FIG. 3 corresponds to the voltage curve (2) of FIG. 2 with the difference that the channel which governs this voltage curve has a higher degree of amplification and also a higher voltage offset than that of the other channel. As can be seen from curve (3) of FIG. 3, the output of the difference forming device D results from the two voltages curves from (1) and (2) causes an asymmetrical discriminator curve which is displaced relative to the zero line. In relationship to the discriminator curve which would have occurred had the two channels had identical amplification and zero offset and which is illustrated in dashed line, the unequal channels of the example illustrated in FIG. 3 result in a shift of the zero point toward the left by an amount $\epsilon$. The synchronization error which will be produced by the example illustrated in FIG. 3 will also be equal to $\epsilon$.

When the regulating accuracy must be maintained at rigid requirements, the cost of constructing two channels having equal gain and zero shift is substantial. For this reason, a search for other solutions has been made. The publication "IEEE Transactions on Aerospace and Electronic Systems" Volume AES-10, No. 1 of January 1974 at pages 2 through 9 illustrate that it is known to provide a single channel and to have a controllable phase shift arrangement at the output of the voltage controlled oscillator which shifts the timing pulse for the pseudo-random generator back and forth periodically, for example, within a range $\Delta$. At the same time, at the output side of the one channel prior to the loop filter, a controllable sign inverter is mounted which reverses the sign of the signal at the output of the network periodically in synchronism with the phase shift of the timing pulse. However, this system produces a loss in the signal to noise ratio of 3 dB. The same loss also exists in another embodiment discussed in the same publication which has two channels and in which the two channels are provided at their output ends with on-off switches which are controlled in such a manner that alternately one or the other of the two channels is effective to act with the associated input of the difference forming device.

It is an object of the present invention to provide a follow-up phase regulating circuit of the type discussed above which compensates for zero point errors caused by inequality in the two channels and in the discriminator curve which avoids the loss in signal to noise ratio of 3 dB which occurs in compensating devices of the prior art.

In the present invention, phase follow-up regulating circuits of the prior art operating according to the DLL principle are modified by the insertion of a pair of commutators with the first commutator connected between the outputs of the pseudo-random generator and the first and second mixers and a second commutator placed at the output of the two channels between the networks and the difference forming device and wherein the commutators are commonly switched between their two switching states by a pulse train source which switches them periodically and in synchronism.

The two commutators which in the timing of the frequency of the pulse train source connects the terminals of the second inputs of the two mixers and the two outputs of the pseudo-random generator and the second commutator which sequentially switch the outputs of the two networks to different inputs of the difference forming device have the advantageous results that they ensure a constant simultaneous operation of the two channels so that the phase follow-up regulating circuit equipped according to the invention has the same sensitivity as it would have without commutation. In actual practice, it has been discovered that the cost and technical outlay using the commutation technique is considerably less than the technical outlay required to assure that each of the two channels have the same gain and zero point error to maintain the theoretical position of the zero point of the discriminator curve centered.

In the present invention, the period of oscillation of the pulse train source is selected to be sufficiently great relative to the build-up time of the networks of the signal channels in the present invention.

The networks N1 and N2 of prior art phase follow-up regulating circuits such as illustrated in FIG. 1 consist of low pass filters for phase coherent phase regulating circuits. The mixers M1 and M2 preceding these networks can be modulo-2-adders. If the pulse sequence appearing at the input E is impressed upon a carrier oscillation the networks N1 and N2 consist of band-pass filters with a switched-through, linear or quadratic rectifier.

Figure 4:
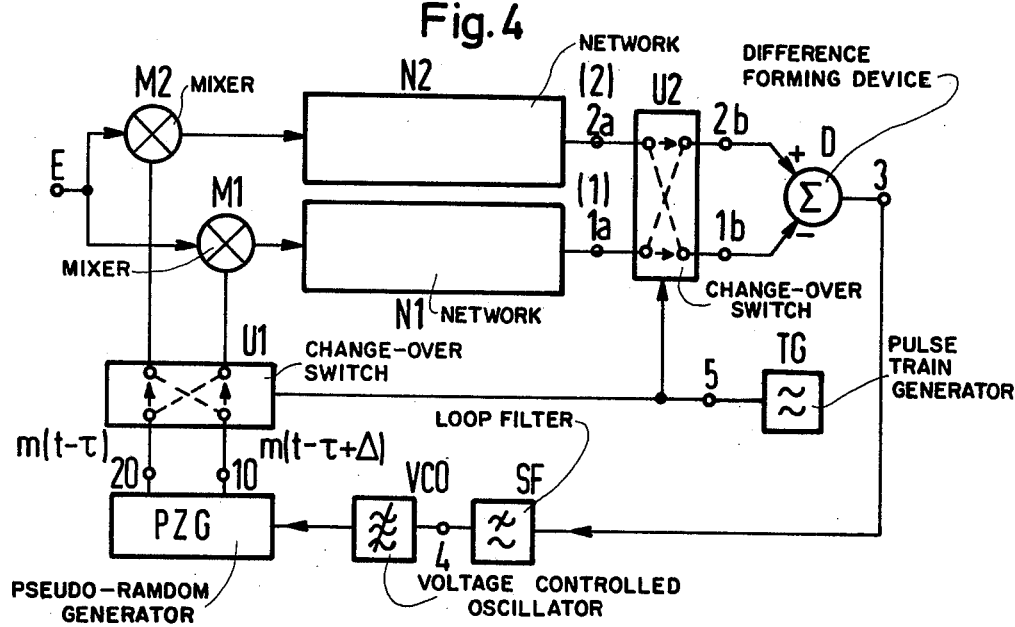
FIG. 4 is a block diagram of a phase follow-up regulating circuit according to the invention.

FIG. 4 illustrates the phase follow-up regulating circuit of the invention and consists of the circuit shown in FIG. 1 modified by the addition of the two change-over switches U1 and U2 and the pulse train generator source TG. The other elements of the invention are similar to those illustrated in FIG. 1 and will not be described in detail. The change-over switch U1 is connected between the output of the pseudo-random generator PZG and the mixers M1 and M2 such that the inputs 10 and 20 from the pseudo-random generator PZG are alternately switched between the mixers M1 and M2. The change-over switch U2 receives the outputs 1a and 2a from the networks N1 and N2 and supplies outputs to the difference forming device D such that the inputs 1b and 2b are alternately switched from the outputs of the networks N1 and N2. Both of the change-over switches U1 and U2 are controlled commonly by the pulse train sequence of the pulse train source TG which switches them periodically and in synchronizm. In the first switch position of the change-over switches U1 and U2, the connections are as shown in solid line and correspond to the conditions illustrated in FIG. 1. In the second switch position, which is illustrated in dashed line in FIG. 4, the output 10 is connected to the mixer M2 and the output 20 is connected to the mixer M1. At the same time, the output 1a is connected to the input 2b of the difference forming device D and the output 2a is connected to the input 1b of the difference forming device D.

In the circuit illustrated in FIG. 4, particular circuit points are designated by the numbers 1, 2, 3, 4, 1a, 2a, 1b and 2b and the voltages appearing at these points are illustrated in the curves of FIG. 6 wherein the voltages U are plotted against the t. In each curve, the voltages which occur at the relevant circuit points are identified by a point numbers appearing at the left end of the curves and the voltage curves are shown when the shift parameter $\tau$ changes with time $t$.

FIG. 6 also includes the curve for the voltage identified by 5 over the time $t$ which corresponds to the timing pulse train at circuit point 5 in FIG. 4 and which is the output of the pulse train source generator TG illustrated in FIG. 4. In the curves of FIG. 6, it is been assumed that the first channel comprising the mixer M1 and the network N1 has a lower degree of amplification than the second channel consisting of the mixer M2 and the network N2 and it is also assumed that the second channel has a greater offset voltage than the first channel. According to these assumptions with the different levels without the commutation voltage of the invention, the results illustrated in FIG. 3 would occur. However, with the commutation according to the invention with the circuit illustrated in FIG. 4, improved results are obtained. So as to indicate the effects on commutation according to the invention in curve 1a, 2a, 1b and 2b the voltage curve at the connecting point (1) is illustrated in dotted lines and the voltage curve at connecting point (2) is illustrated in broken lines. The change-over switches U1 and U2 are operating with the timing of the pulse train sequence corresponding to voltage curve (5) so that the voltage curve shown in the corresponding diagrams occur at the connecting points 1a and 2a. Both voltage curves are composed of successive sections which alternately originate from the outputs of the mixers M1 and M2. The envelope curve of both voltage curves has a different amplitude corresponding to the different amplification of the two channels. This scrambling is discontinued again by the change-over switch U2 at the connection points 1b and 2b. At the same time, the successful elimination of the asymmetry in the two channels produced by commutating according to the invention is clearly illustrated. The voltage curves according to diagrams 1b and 2b in FIG. 6 have mutual phase shift and also equal amplitudes at the output of the difference forming device D which is connection point 3. The two voltage curves at connecting points 1b and 2b are combined to form the desired discriminating curve illustrated in diagram 3 of FIG. 6. The super-imposition of the timing pulses of the pulse train source TG on the curve is eliminated as the signal passes through the loop filter SF and the desired discriminator curve which is symmetrical relative to the zero point is produced at the connecting point 4. Diagram 4 in FIG. 6 illustrates clearly the success achieved by the commutation system of the invention and it is seen that the discriminator curve of the invention shown in solid line is substantially improved over the non-symmetrical discriminator curve illustrated for systems such as shown in FIG. 1 of the prior art which is shown in dash-dot fashion in diagram 4 of FIG. 6.

Figure 5:
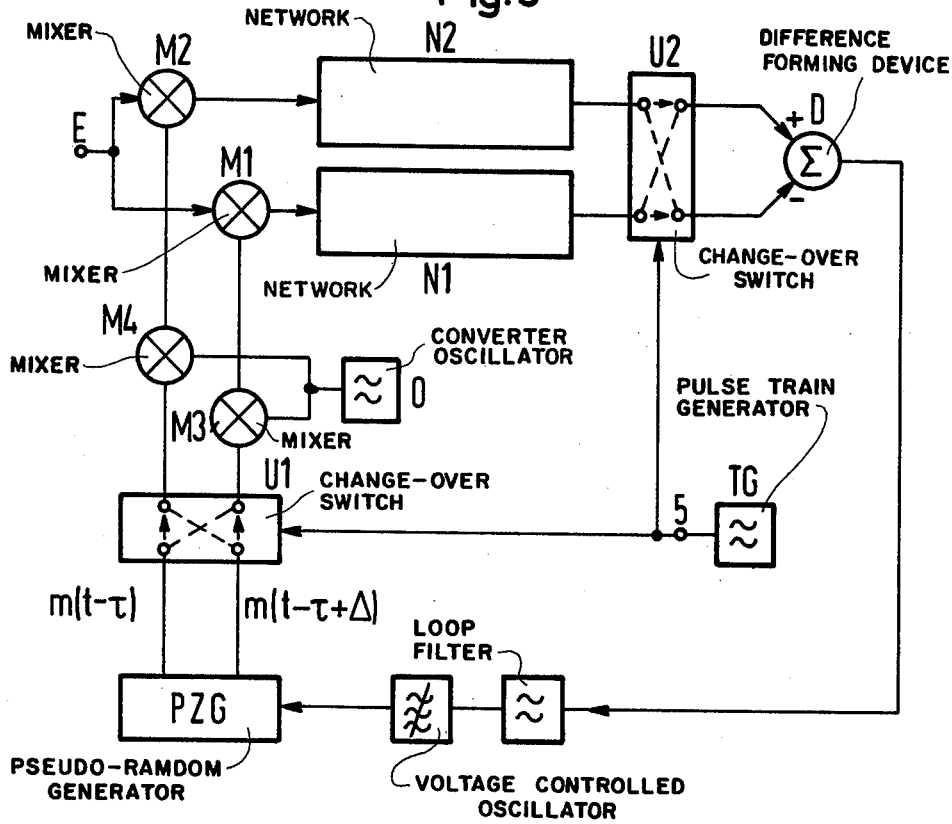
FIG. 5 is a modification of the invention.

FIG. 5 illustrates a modification of the invention wherein there is added to the circuit of FIG. 4 a converter oscillator O and two additional mixers M3 and M4. Each of the mixers M3 and M4 receive inputs from the converter oscillator O. The mixer M3 receives an output from the change-over switch U1 and supplies an output to the mixer M1. The mixer M4 receives an input from the change-over switch U1 and supplies an output to the mixer M2. The circuit of FIG. 5 comprises a phase follow-up regulating circuit which has high interference resistance. Since the additional mixers M3 and M4 are located within the portion of the circuit controlled by the two change-over switches U1 and U2, any disturbing dissimilarities caused by the mixers M3 and M4 will be eliminated by the commutating arrangement illustrated in FIG. 5.

Although the invention has been described with respect to preferred embodiments, it is not to be so limited as changes and modifications may be made therein which are within the full intended scope of the invention as defined by the appended claims.

We claim as our invention:

1. A phase follow-up regulating circuit operating according to the delay lock loop principle, for phase-coherent synchronization of the pulse sequence of a receiver pseudo-random generator controlled by a pulse train oscillator with the incoming pulse sequence which may be modulated on a carrier, a transmitter having a pseudo-random generator identical to the receiver, first and second identical signal channels, two mixers with one included in each of said first and second signal channels and each controlled by the pulse sequence output of the receiver pseudo-random generator, two filtering networks respectively receiving the outputs of said two mixers, said first and second signal channels having their inputs connected in parallel, a difference forming device receiving the output signals of said first and second signal channels from said two filtering networks, a loop filter receiving the output of said difference forming device, a voltage controlled oscillator which is controllable in frequency receiving an input from said loop filter and supplying an input to said receiver pseudo-random generator, further including a first commutator switch receiving two outputs of said receiver-end pseudo-random generator and supplying inputs to said two mixers and a second commutator switch receiving the outputs of said two filtering networks and supplying inputs to said difference forming device and a pulse train oscillator for switching said two commutator switches back and forth between their two switching states periodically and in synchronism with a pulse train from said pulse train oscillator.

2. A phase follow-up regulating circuit as claimed in claim 1 wherein in the period duration of the output oscillation of the pulse train oscillator is large relative to the signal build-up time of said two filtering networks as determined by their time constants.

3. A phase follow-up regulating circuit comprising:
first and second mixers receiving an incoming signal which is to be demodulated,
first and second filtering networks respectively receiving the outputs of said first and second mixers,
a pseudo-random generator producing two outputs having different phases,
a first commutator switch with two input and two output terminals receiving the two outputs of said pseudo-random generator and supplying a pair of outputs to said first and second mixers and periodically switching and reversing the connections of its two output terminals to its two input terminals in synchronism with the switching of said first commutator switch,
a pulse train oscillator connected to said first and second commutator switches to switch them, and
control means receiving the output of said difference forming means and supplying an output to said pseudo-random generator to control it.

4. A phase follow-up regulating circuit according to claim 3 wherein said control means includes a voltage controlled oscillator which has its frequency controlled by the output of said control means and which supplies an output to said pseudo-random generator.

5. A phase follow-up regulating circuit according to claim 4 wherein said control means includes a filter connected between said voltage controlled oscillator and said difference forming means.

6. A phase follow-up regulating circuit comprising:
first and second mixers receiving an incoming signal which is to be demodulated,
first and second filtering networks respectively receiving the outputs of said first and second mixers,
third and fourth mixers supplying outputs to said first and second mixers,
a pseudo-random generator producing two outputs having different phases,
a first commutating switch having two input and two output terminals with said input terminals receiving the two outputs of said pseudo-random generator and supplying a pair of inputs to said third and fourth mixers and periodically switching and reversing the connections of its output terminals to its two input terminals,
a difference forming means with two input terminals,
a second commutating switch with two input and two output terminals with the input terminals respectively connected to the outputs of said first and second filtering networks said output terminals supplying a pair of outputs to said two input terminals of said difference forming means and periodically switching and reversing the connections of its output terminals to its two input terminals in synchronism with the switching of said first commutator switch,
a pulse train oscillator connected to said first and second commutator switches to switch them,
a converting oscillator supplying inputs to said third and fourth mixers, and
control means receiving the output or said difference forming means and supplying an output to said pseudo-random generator to control it.

7. A phase follow-up regulating circuit according to claim 6 wherein said control means includes a voltage controlled oscillator which has its frequency controlled by the output of said control means and which supplies an output to said pseudo-random generator.

8. A phase follow-up regulating circuit according to claim 7 wherein said control means includes a filter connected between said voltage controlled oscillator and said difference forming means.

* * * * *